C. B. KIRKHAM.
THRUST BEARING FOR AERONAUTICAL MOTORS.
APPLICATION FILED APR. 28, 1916.

1,287,339.

Patented Dec. 10, 1918.
2 SHEETS—SHEET 1.

Inventor
CHARLES B. KIRKHAM.

By

Attorney

C. B. KIRKHAM.
THRUST BEARING FOR AERONAUTICAL MOTORS.
APPLICATION FILED APR. 28, 1916.

1,287,339.

Patented Dec. 10, 1918.
2 SHEETS—SHEET 2.

Inventor
CHARLES B. KIRKHAM.
By
John P. Farbox
Attorney

UNITED STATES PATENT OFFICE.

CHARLES B. KIRKHAM, OF BUFFALO, NEW YORK, ASSIGNOR TO CURTISS AEROPLANE AND MOTOR CORPORATION, A CORPORATION OF NEW YORK.

THRUST-BEARING FOR AERONAUTICAL MOTORS.

1,287,339.  Specification of Letters Patent.  Patented Dec. 10, 1918.

Application filed April 28, 1916. Serial No. 94,151.

*To all whom it may concern:*

Be it known that I, CHARLES B. KIRKHAM, a citizen of the United States, residing at Buffalo, in the county of Erie and State of New York, have invented certain new and useful Improvements in Thrust-Bearings for Aeronautical Motors, of which the following is a specification.

My invention relates to aircraft equipment and has special reference to an improved construction, combination and arrangement of new and old elements whereby a combined radial and axial thrust bearing is so disposed as regards the crank case of an aeronautical motor as to take up effectually and without axial play the axial and radial thrust of a propeller shaft regardless of the nature of the propeller and without change or alteration in the bearing parts.

It is the universal practice in the aeronautical art, and in the construction of aircraft, to provide a specific type of bearing for a propeller shaft equipped with a tractor propeller and a different type or construction of bearing for a propeller shaft equipped with a pusher propeller. Such practice necessitates either a rearrangement of the bearing parts or the removal of one bearing and the substitution of another should the propeller of the craft be shifted from a point forwardly of the center of pressure to a point aft thereof. This interchange of elements is troublesome, tedious and often unsatisfactory since each and every part of the thrust bearing is located interiorly of the motor crank case and cannot be altered without entirely removing the rear-end crank case cover or other parts thereof.

After experimentation and much thought, the device of my invention hereinafter disclosed is proposed to overcome the aforementioned objectionable features and provide instead a thrust bearing arrangement which may be efficaciously employed, without even the slightest alteration, interchangeably with aircraft of either the tractor or pusher type.

In describing my invention in detail, reference will be had to the accompanying drawings wherein like characters of reference designate corresponding parts throughout the several views, of which:

Figure 1:
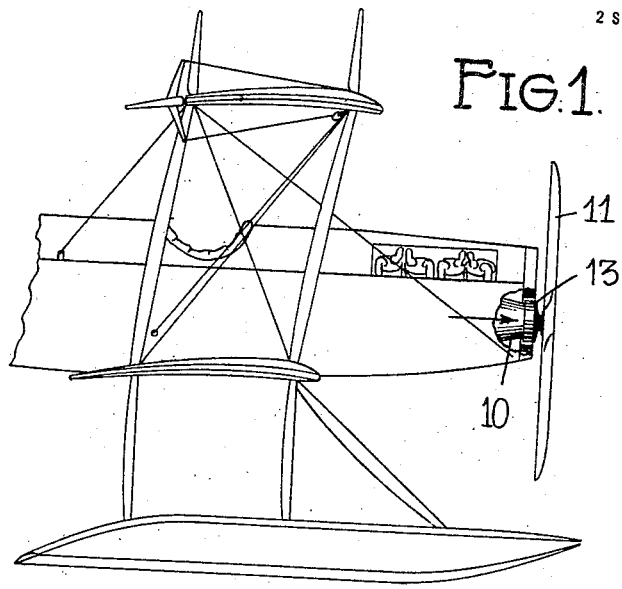
Figure 1 is a fragmentary elevation of an aeronautical motor equipped with a tractor propeller.
Figure 2:
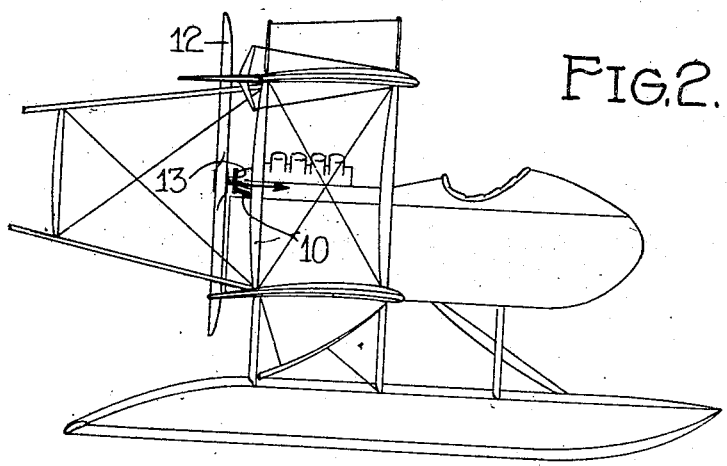
Fig. 2 is a similar view of an aeronautical motor equipped with a pusher propeller.
Figure 3:
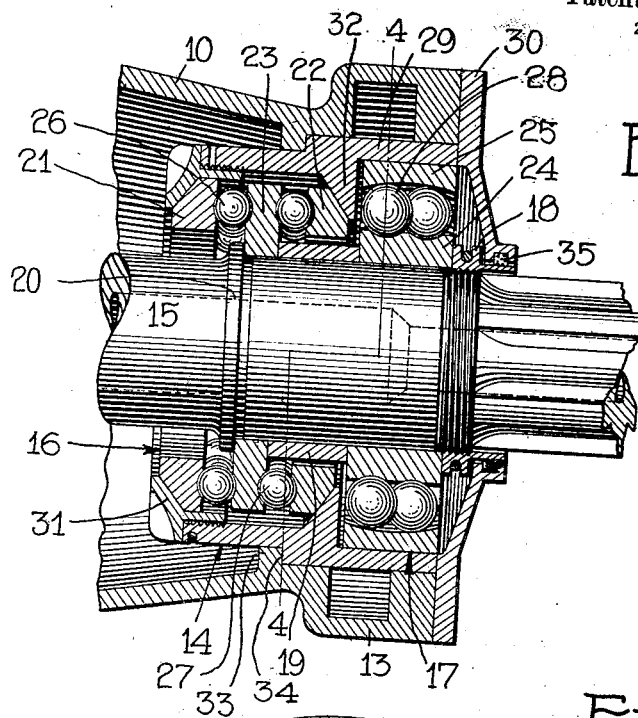
Fig. 3 is a detail longitudinal sectional view of my improved aircraft crank shaft thrust bearing.
Figure 4:
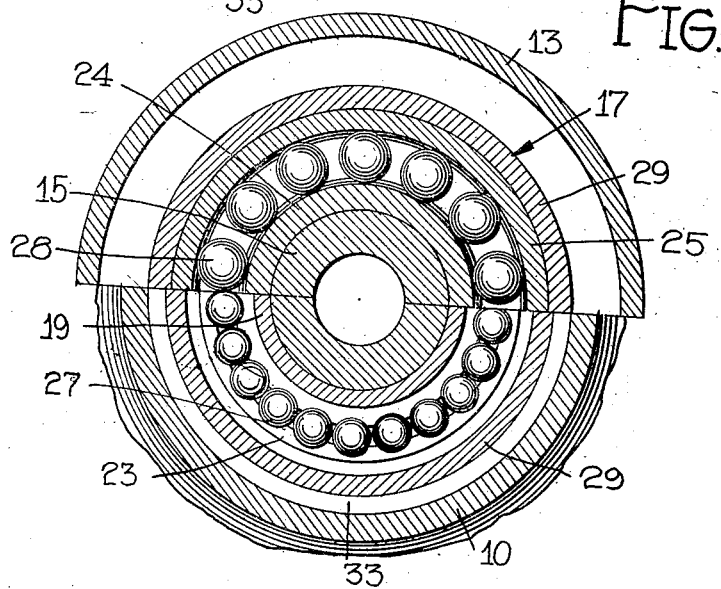
Fig. 4 is a transverse section on the line 4—4 of Fig. 3.

As intimated hereinbefore, it is the aim of the present invention to compensate for both the radial and axial thrust occasioned by the rapid rotation of an aircraft propeller regardless of the direction of axial thrust and without alteration of the bearing parts. In the embodiment of the invention selected for illustration, 10 designates the streamlined prolongation usually found at the aft end of the crank case of an aeronautical motor and made as an integral part thereof. In Fig. 1, I have illustrated fragmentarily an aircraft equipped with a tractor propeller designated 11 and Fig. 2 a similar view of an aircraft equipped with a pusher propeller designated 12, since it is the common practice in the aeronautical art to mount the propeller or propellers either at a point in advance of the center of pressure on the sustaining surfaces (not shown) or at the rear thereof. Propellers mounted in advance of the center of pressure or in such relation to the aircraft as to exert a forward axial thrust are termed tractor propellers and propellers mounted in such relation to the aircraft as to exert axial thrust in the opposite direction are termed pusher propellers. The direction of axial thrust is indicated by arrows in Figs. 1 and 2 respectively.

An enlargement 13 is formed at the outer end of the prolongation 10 to receive the device of my invention designated in its entirety by the numeral 14 and hereinafter referred to as a combined axial and radial thrust bearing. The crank shaft of the motor, denoted 15, is mounted concentric to the enlargement 13 and to extend without the crank case at the aft end of the motor, the extended portion affording a combined alining and driving terminal for either a tractor propeller 11 or a pusher propeller 12, as the case may be.

The combined axial and radial thrust bearing 14 may be generally described as comprising a self-contained, self-alining double axial thrust bearing 16 and a radial thrust bearing 17, the latter engaging at one end a nut lock 18 mounted to threadedly engage the shaft 15, and at its opposite end a bearing-spacer 19 of a size to snugly embrace that portion of the shaft 15 intermediate the combined alining and driving terminal and an annular flange 20 formed upon said shaft to engage with the intermediate element of the axial thrust bearing 16.

Both the axial thrust bearing 16 and the radial thrust bearing 17 are of a standard type, the former comprising outer bearing rings 21 and 22 and an intermediate bearing ring 23 and the latter, an inner bearing ring 24 and an outer and somewhat larger bearing ring 25. Ball-bearings 26 engage between the bearing ring 21 and the bearing ring 23 and ball-bearings 27 between the bearing ring 23 and the bearing ring 22, this arrangement providing for the compensation of the axial thrust without regard to the type or nature of propeller used. Ball-bearings 28 engage between the inner bearing ring 24 and the outer bearing ring 25 of the radial thrust bearing for an obvious purpose.

As a means whereby the bearings 16 and 17 are held against axial play, I provide a sleeve 29, a rear end crank case cover 30, the nut 18 and an alining ring 31, the latter threadedly engaging with the sleeve 29 at its inner end to secure adjustment should occasion demand. Bearing ring 21 is mounted to engage at its inner end with the alining ring 31, bearing ring 22 with an annular inwardly directed flange 32 formed upon the sleeve 29, and bearing ring 24, as stated, with the nut 18 and the bearing spacer 19. Any suitable means may be provided to secure the nut 18 against movement with respect to the shaft subsequent to adjustment.

To preclude axial displacement of the sleeve 29 and consequently the bearing parts inclosed therein, the prolongation 10 of the crank case is annularly inwardly flanged as indicated at 33 whereby to engage with an annular shoulder 34 formed on the outside surface of said sleeve. This abutting engagement between the sleeve 29 and the flange 33 will preclude axial movement of the former in one direction while its engagement with the cover plate 30 at its opposite end will preclude axial displacement in that direction. Suitable means such as I have illustrated at 35 may be utilized to preclude the admission of grit, dust, and other extraneous matter to the bearing parts.

Through such an arrangement of elements as I have just described, it is evident that the radial thrust occasioned by the rapid rotation of either a pusher or a tractor propeller will be borne entirely by the radial thrust bearing 17. The axial thrust occasioned by the rotation of a tractor propeller will be borne by the thrust bearing 14 to which the thrust is directly imparted via the flange 20 and the intermediate bearing ring 23. Thrust in the opposite direction occasioned by the rapid rotation of a pusher propeller will likewise be borne by the bearing 16, the thrust, however, in this latter instance is transmitted from the shaft 15 to said bearing via the nut 18, the inner bearing ring 24 of the radial thrust bearing, the bearing spacer 19 and the intermediate bearing ring 23; the flange 20 in this latter instance serving no purpose whatsoever in transmitting axial thrust.

Such an arrangement as that described is essentially advantageous in that it is unnecessary to interchange or alter the bearing parts in the event of the utilization of either type of propeller. Each and all of the bearing parts are of a construction permitting quick assembly, and of a minimum cost since both the radial thrust bearing and the axial thrust bearing are of a standard type.

While in the foregoing there has been illustrated in the drawings and described in the specification such combination and arrangement of elements as constitute one preferred construction or embodiment of this invention, it is nevertheless desired to emphasize the fact that an interpretation of the invention should only be conclusive when made in the light of the sub-joined claims.

What is claimed is:

1. In an internal combustion engine, a main drive shaft, a crank case, a crank case contained thrust bearing for said shaft, said bearing comprising means for absorbing axial thrust in either direction, and a container unit for said bearing adapted to be anchored within the end of the crank case.

2. In combination with an internal combustion engine motor for driving an aeroplane propeller of either the pusher or tractor type, a combined radial and double acting axial thrust bearing carried within the crank case extremity of said motor as a housing, said bearings inter-engaging with each other to properly position them on the motor shaft.

3. In combination with an internal combustion engine driving an aeronautical propeller, a thrust bearing arranged to absorb forward thrust and rearward thrust as produced respectively by propellers of the tractor or of the pusher type, and a container unit for said bearings adapted to be anchored within the crank case.

4. In combination with an internal combustion engine, a crank case having an interiorly annularly flanged extremity, and a thrust bearing unit comprising a containing shell of substantially cylindrical form seated in said crank case and abutting said flange.

5. In combination with an internal combustion engine for driving an aeroplane propeller of either the pusher or tractor type, a crank-case inclosing a bodily removable bearing, said bearing comprising an outer containing shell inclosing a radial thrust bearing and a double acting axial thrust bearing, said bearings inter-engaging with each other to properly position them on the engine shaft, and means retaining said shell seated within said crank-case.

6. In an internal combustion engine, a crank shaft, an annular shoulder formed thereon, an axial thrust transmission ring, a spacer ring, a radial thrust bearing ring, and means adjustably holding the several rings in abutting relation, and the innermost ring in engagement with said shoulder.

7. In an internal combustion engine for driving an aeroplane propeller of either the pusher or tractor type, a crank shaft to which said propeller is adapted to be connected, a crank-case having an interiorly annularly flanged extremity, a bodily removable shell adapted to fit within said extremity and abut said flange, a radial thrust bearing and a double acting axial thrust bearing inclosed within said shell, said bearings inter-engaging with each other to properly position them on the motor shaft, and means retaining said bearing shell within said crank-case extremity.

8. In a propeller shaft bearing for use with an internal combustion driving engine, the combination of a crank case housing with a thrust bearing carried therein and adapted to absorb either forward or rearward thrust as produced respectively by propellers of the tractor or of the pusher type, said bearings being contained in a unitary structure and insertible as a unit within the end of the crank case.

9. In a propeller shaft bearing for use with an internal combustion driving engine, the combination of an open ended crank case, with a combined radial and double acting axial thrust bearing carried within said open end as a housing, the inner race ring of the radial bearing serving as a means for retaining the axial thrust bearing in operative position on the shaft, and a cover plate adapted to be attached to said open end.

10. In a bearing for a propeller of either the pusher or tractor type, the combination of a support, a sleeve carried thereby and encircling the shaft, a double axial thrust bearing for said shaft located within said sleeve, means for anchoring said sleeve to said support, and means for retaining said bearing within said sleeve and in operative relation with the propeller shaft.

11. In a propeller shaft bearing, the combination of a support, a sleeve carried by said support and encircling said shaft, an axial thrust bearing for said shaft located within said sleeve, a radial thrust bearing also located within said sleeve, said bearings being removable with said sleeve from said shaft and the inner race ring of the radial bearing serving as a means for retaining the axial thrust bearing in operative position on the shaft, and a retaining ring for maintaining said bearings and said sleeve in assembled relation on said shaft.

12. In a bearing for a propeller of either the pusher or tractor type, the combination of a casing inclosing the propeller shaft, a sleeve carried within the end of said casing and encircling said shaft, a double axial thrust bearing within said sleeve, and means including a cover plate for the end of said casing, for retaining said bearings within said sleeve and in operative relation with said propeller shaft.

13. In a propeller shaft bearing the combination of a casing inclosing said shaft, an axial thrust bearing for said shaft located within said casing adjacent one end thereof, a radial thrust bearing for said shaft also located within said casing and adjacent the aforesaid end thereof, means including the inner race ring of the radial bearing for retaining the axial thrust bearing in operative position on the shaft, and a cover plate for the end of said casing encircling said shaft and totally inclosing said bearings.

14. In a propeller shaft bearing, the combination of a casing inclosing said shaft, said casing having an open end, a double axial thrust bearing for said shaft located within said casing adjacent said open end, a radial thrust bearing for said shaft also located within said casing and adjacent the aforesaid end thereof, means including the inner race ring of the radial bearing for retaining the axial thrust bearing in operative position on the shaft, and means for retaining said bearings in operative relation to said shaft, said means including a cover plate for said open ended casing.

15. In a propeller shaft bearing, the combination of a casing surrounding said shaft, said casing having an annular flange on its interior adjacent one end thereof, a removable sleeve or shell adapted to fit within said end and abut against said flange, a double axial thrust bearing for said shaft inclosed within said sleeve and movable therewith as a unit, and means retaining said bearings and shell within said casing comprising a cover plate engaging the end of said casing and said sleeve.

16. In a propeller shaft bearing, the combination of a casing surrounding said shaft, said casing having an open end and an annular flange on its interior, a removable sleeve adapted to fit within said open end and abut against said flange, double axial bearings for said shaft inclosed within said sleeve, and means including a cover plate for said open end for retaining said bearings and said sleeve in operative relation to said shaft and said casing.

17. In an aeroplane propeller shaft bearing the combination of a casing surrounding said shaft, said casing having an open end and an annular flange on its interior, a sleeve adapted to fit within said casing and abut against said flange, said sleeve having an inwardly directed flange midway its length and having on its inner end a detachable alining ring, an axial thrust bearing disposed within said sleeve and between said alining ring and said inwardly directed flange, comprising a bearing ring in engagement with said shaft, a radial thrust bearing on the other side of said inwardly directed flange and within said sleeve comprising a bearing ring in engagement with said shaft, means including said bearing ring for retaining the axial thrust bearing in operative position on the shaft, retaining means on said shaft for maintaining said bearing rings in operative position, and a cover plate for the open end of said casing surrounding said shaft and in engagement with said sleeve.

18. In combination an aeronautical propeller shaft, a bearing housing surrounding said shaft, a radial thrust bearing inclosed within said housing and encircling said shaft, a double axial thrust bearing also within said housing and encircling said shaft for absorbing thrust in either axial direction, said radial bearing and said double axial thrust bearing inter-engaging with each other for proper positioning thereof upon the propeller shaft, and means for retaining said bearing within said housing.

In testimony whereof I affix my signature.

CHARLES B. KIRKHAM.